United States Patent [19]

MacDonald et al.

[11] 3,927,230
[45] Dec. 16, 1975

[54] METHOD OF DECORATING A SURFACE OF AN ARTICLE

[75] Inventors: William E. MacDonald, Los Angeles; Robert C. Harris, Jr., Glendale, both of Calif.

[73] Assignee: Interpace Corporation, Parsippany, N.J.

[22] Filed: Sept. 6, 1974

[21] Appl. No.: 503,844

Related U.S. Application Data

[62] Division of Ser. No. 408,200, Oct. 19, 1973, Pat. No. 3,885,522.

[52] U.S. Cl. .............................. 427/282; 427/287
[51] Int. Cl.[2] .................................. B05D 1/30
[58] Field of Search ........ 117/37 R, 38, 120, 123 R; 118/406, 412, 415; 101/115, 124, 129; 264/132, 310; 427/282, 287, 445

[56] References Cited
UNITED STATES PATENTS

| | | | |
|---|---|---|---|
| 2,492,052 | 12/1949 | Martin | 101/124 |
| 2,961,946 | 11/1960 | Quist | 101/123 |
| 2,961,949 | 11/1960 | Sanderson | 101/163 |
| 3,194,857 | 7/1965 | White | 264/94 |
| 3,464,382 | 9/1969 | Harriman et al. | 118/406 |

*Primary Examiner*—Thomas J. Herbert, Jr.
*Assistant Examiner*—Bruce H. Hess
*Attorney, Agent, or Firm*—Edward F. Jaros

[57] ABSTRACT

A method and apparatus for automatically decorating a surface of an article such as ceramic ware by direct unimpeded deposit thereon of a thick flowable composition material such as a glaze composition. An article surface is pressed into engagement with a mold face having openings therein defining a desired pattern for deposit of the composition material, the openings communicating with a manifold cavity which contains flowable composition material and is in communication with a supply source of such material. In initial position the article surface is above the mold face and manifold cavity and composition material held in the cavity. The article surface and mold face are then vertically reversed in position while retaining sealed contact to cause gravitational flow of the composition material to the openings in the mold face for direct flow of the composition material into contact with the article surface. After a predetermined time, the article and mold member are returned to their original position and excess composition material is removed from the article surface by flowing therefrom. The amount of composition material deposited on the article surface in the pattern defined by the mold face openings depends upon characteristics of the article surface and composition material. An apparatus for automatically performing the steps of pressure engagement of the article face and mold face, reversal of position of the two faces while in pressure engagement, and the return to initial position of the mold face and article face in preselected timed relation to provide desired application or deposition of glaze composition material in a desired pattern on the article surface.

12 Claims, 18 Drawing Figures

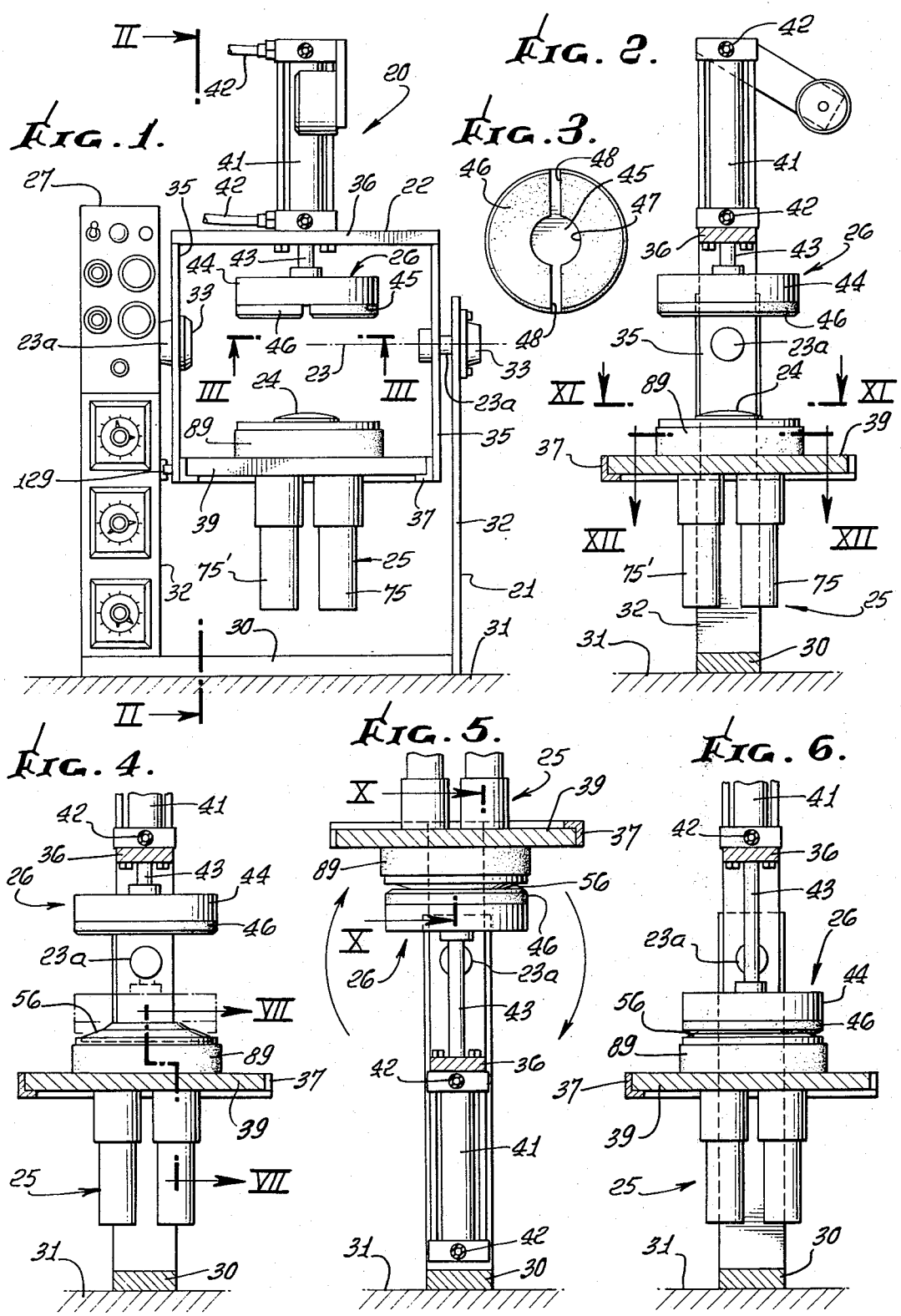

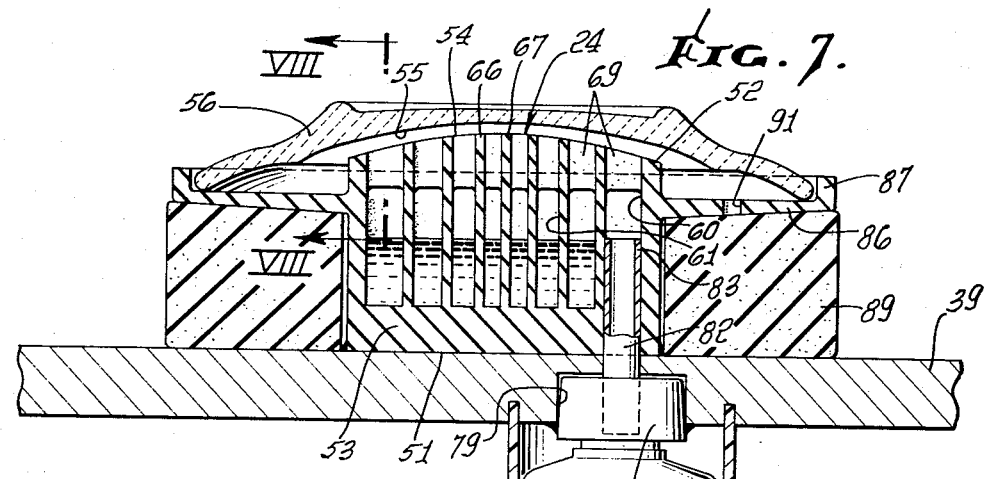
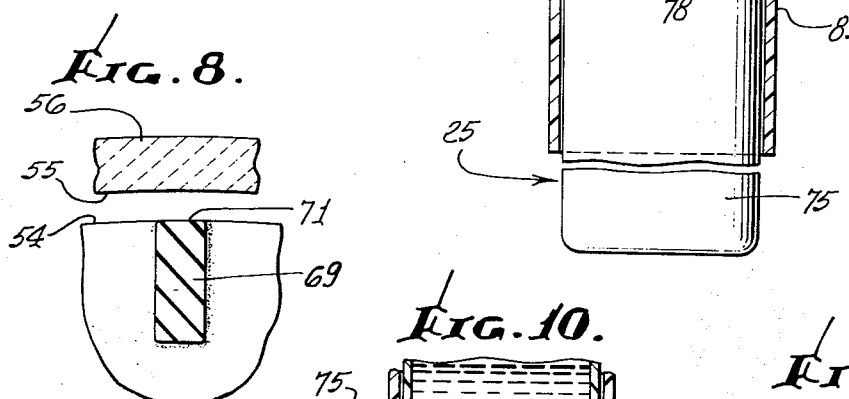
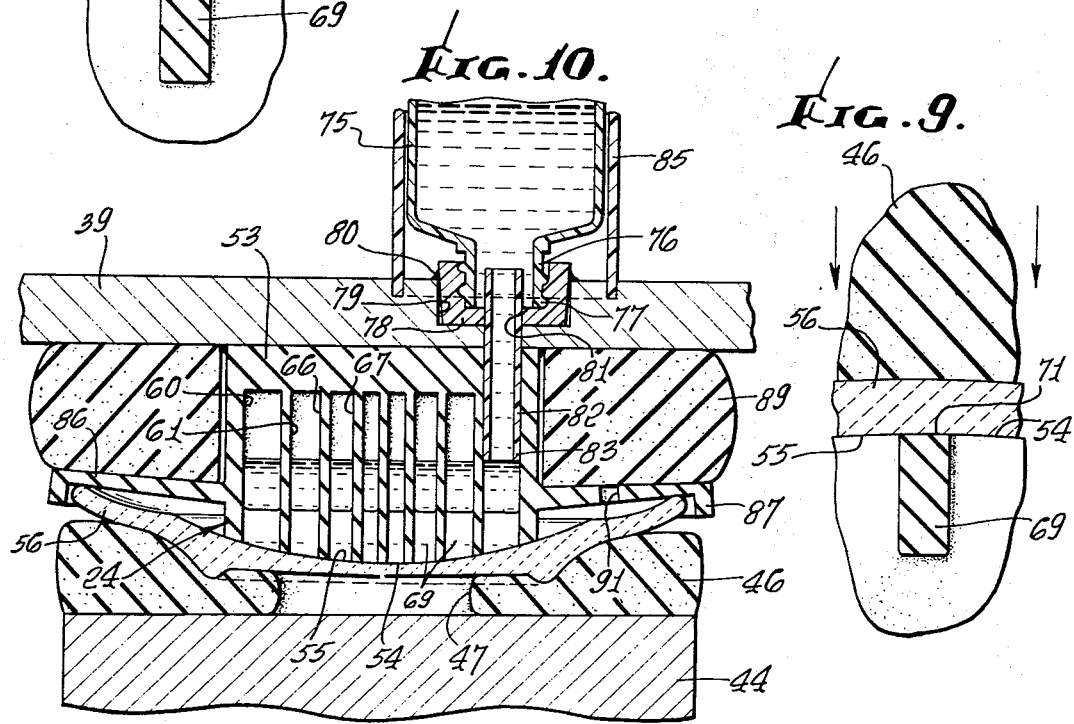
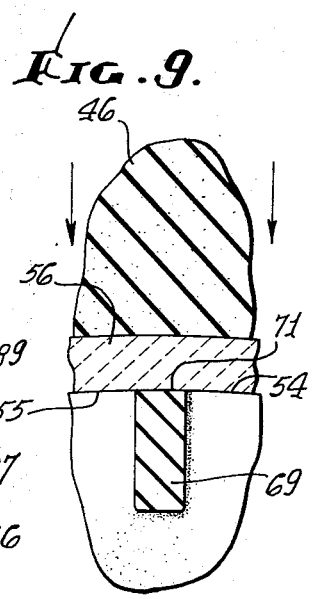

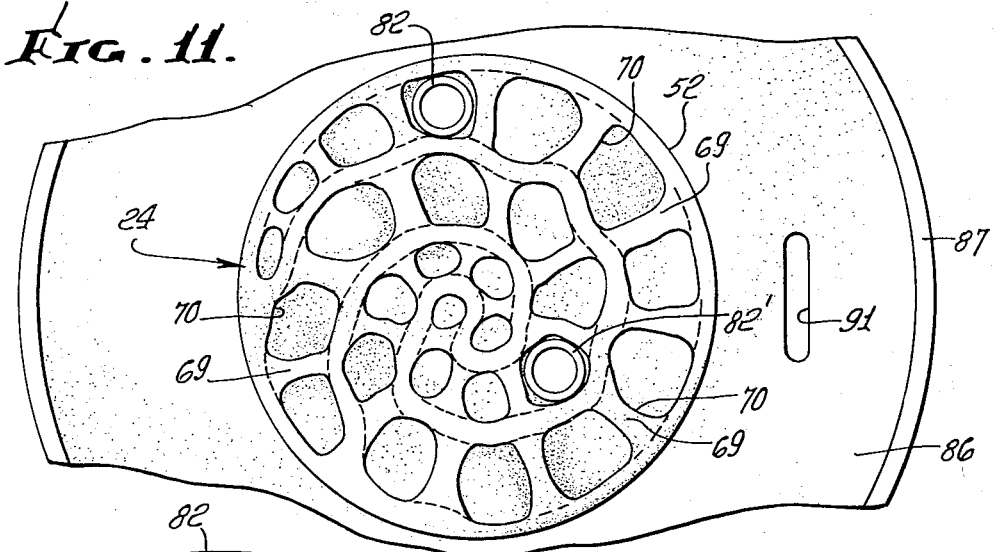
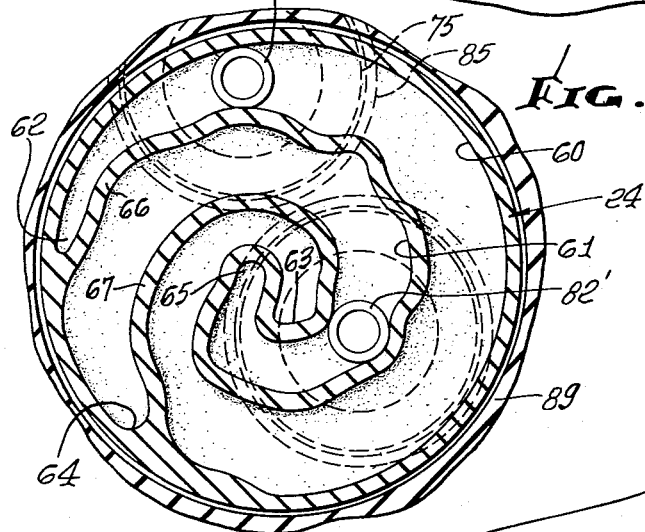
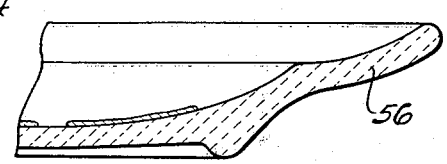
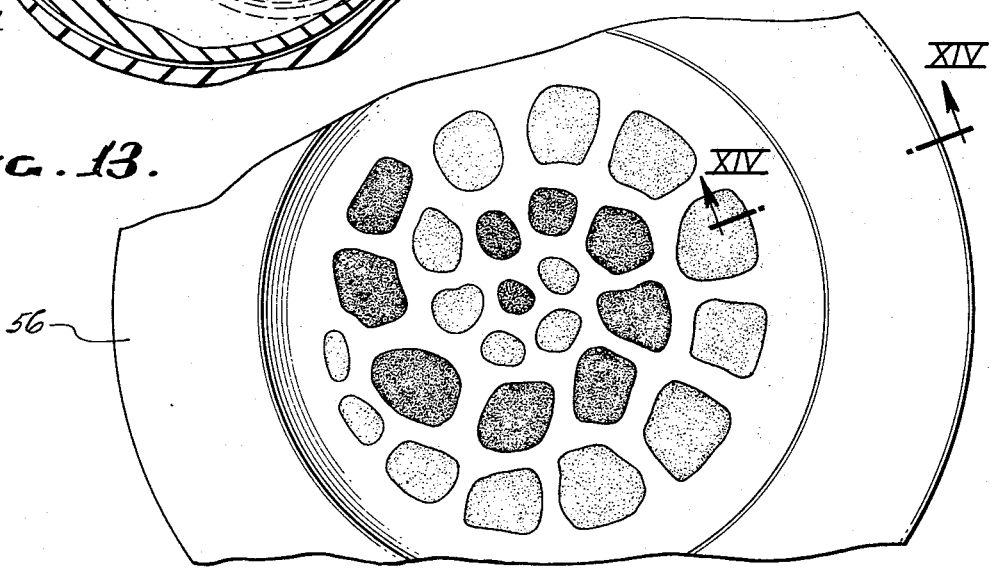

METHOD OF DECORATING A SURFACE OF AN ARTICLE

This is a divisional application of application Ser. No. 408,200 filed Oct. 19, 1973, now U.S. Pat. No. 3,885,522.

BACKGROUND OF INVENTION

Decoration of surfaces of ceramic ware such as dinnerware, ceramic tile, and other ceramic articles by various methods is well known. Such prior methods of decoration have included application of under and over colorant compositions, either with or without patterns or designs; decalcomanias, paper transfers, stamping, printing, stenciling, hand painting, and the application of a liquid decorative material to a ceramic surface by hand bulbing.

In the method of decorating by hand bulbing, a dinner plate for example, was supported upon a rotating table, the surface to be decorated was stamped with the desired design or pattern. The areas delineated by the stamped design pattern were then covered by manually squeezing a bulb with a ported bulb stem to flow a colorant composition from the bulb stem onto a selected area on the ceramic surface in a sequential manner. As the operator progressed from one area to another, the ceramic ware was capable of being moved on the rotatable table to facilitate such hand bulbing decorating process.

Such hand bulbing decorating of dinnerware was time consuming, tedious, and was basically piece work. The number of pieces of dinnerware decorated within a particular time period depended upon the skill, care and dexterity of the operator. Standards for such decoration required substantial uniformity of the patterns of a set of dinnerware which may include from four to 12 pieces of dinnerware of the same size and patterns such as a dinner plate. Since the market demands thousands of pieces of dinner plate, it is readily apparent that the method of decorating dinnerware by hand bulbing provides extreme limitations on the number of pieces which can be decorated within a selected time period. In order to meet the market demand for certain dinnerware patterns, many operators are required for hand bulbing decorating with the result that labor costs are very high.

SUMMARY OF INVENTION

The present invention relates to a novel method and apparatus for decorating the surface of an article such as a dinner plate by an automatic controlled machine capable of accomplishing the same results as hand bulbing. The automatic machines require minimal attention by an operator and a single operator may attend to three or more machines depending upon the time period of an overall cycle of the machine. The present invention provides an automatic machine which is capable of flowing a colorant composition material onto a select pattern in a rapid accurate manner and without the possibility of defects or errors in the pattern design which, in the hand bulbing operation, may be caused by carelessness or lack of dexterity of the operator.

The primary object of the invention therefore is to provide a method and apparatus for decorating the surface of an article such as ceramic ware to provide a result similar to decoration by hand bulbing.

An object of the invention is to provide a novel method of decorating the surface of an article wherein decorative composition material is caused to virtually simultaneously flow upon the entire article surface to be decorated in accordance with a preselected pattern.

An object of the invention is to provide a method and apparatus for applying a decorative composition material to a surface of an article of ceramic ware wherein a pattern defining means is pressed agains the surface to afford sealed pattern areas, the article and pattern defining means being turned about an axis into a position where gravitational flow of decorative material almost simultaneously and uniformly contacts sealed-off pattern defined areas to deposit a selected amount of such material thereon.

A further object of the present invention is to provide an apparatus and method for applying to an article surface a relatively thick application of decorative material on an area of the surface of the article to be decorated.

A more specific object of the present invention is to provide an apparatus for automatically decorating a surface of ceramic ware wherein pattern defining means are provided by a novel mold member which is engaged under pressure with the article surface to be decorated.

Still another specific object of the present invention is to provide an apparatus for decorating an article surface wherein a mold member containing colorant composition material for application to said surface is in communication with a supply of such composition material to facilitate continuous operation of the apparatus.

A further object of the invention is to provide a method and apparatus for deposition of a decorative colorant material on a surface of a jigger mold or the like to produce an inlay in the finished ceramic ware.

Generally speaking, the apparatus of this invention includes means providing a source of colorant composition material which is in communication with cavities or chambers in a mold member which serve as a reservoir of composition material to be applied to an article surface. The cavities in the mold member communicate with openings on a mold face, the edges of the openings defining a pattern for deposition of the composition material. The relative positions of the article surface and the mold member are reversed so that the composition material in the mold cavity flows by gravitation onto the article surface as defined by the pattern edges of the openings. Depending upon the porosity of the ceramic ware and the viscosity of the decorative material and its composition, the article surface and mold member are held and maintained in such position for a selected time period to provide penetration of the composition material in the article surface, if porous, or sufficient deposition thereon, if non-porous, so that when the article surface and mold member are returned to their original position a desired amount of decorative composition material is retained on the article surface. The changing of position of the mold member and article surface drains excess composition material away from the surface area to be decorated and the excess composition material may flow into a receptacle containing the supply of composition material.

Various other objects and advantages of the present invention will be readily apparent from the following description of the drawings in which an exemplary embodiment of the invention is shown.

IN THE DRAWINGS

FIG. 1 is a side elevational view of an exemplary apparatus embodying this invention, the apparatus being shown in open or plate receiving position.

FIG. 2 is a vertical sectional view taken in the plane indicated by line II—II of FIG. 1.

FIG. 3 is a fragmentary bottom view of the ram shown in FIG. 1, the view being taken in the plane indicated by line III—III of FIG. 1.

FIG. 4 is a fragmentary vertical sectional view taken in the plane similar to that of FIG. 2 and showing a plate carried on the mold member, the phantom lines indicating the closed or down position of the ram.

FIG. 5 is a fragmentary sectional view taken in the plane of FIG. 2 showing rotation of the ram, plate, and mold member through 180° to reverse or invert the position of the apparatus shown.

FIG. 6 is another fragmentary vertical sectional view taken in the plane of FIG. 2 showing the mold member, plate and ram returned to its original vertical relationship.

FIG. 7 is an enlarged fragmentary sectional view taken in the planes indicated by line VII—VII of FIG. 4.

FIG. 8 is an enlarged fragmentary sectional view taken in the plane indicated by line VIII—VIII of FIG. 7.

FIG. 9 is an enlarged fragmentary sectional view taken in the same plane as that of FIG. 8 and showing the pressure sealed engagement of the mold member, plate, and ram.

FIG. 10 is a fragmentary enlarged sectional view taken in the same plane as that of FIG. 7 showing the mold member, plate, and ram in the inverted position of FIG. 5.

FIG. 11 is an enlarged fragmentary top plan view of a mold member, the view being taken from the plane indicated by line XI—XI of FIG. 2.

FIG. 12 is an enlarged fragmentary sectional view of the mold member taken in the plane indicated by line XII—XII of FIG. 2.

FIG. 13 is an enlarged fragmentary top plan view of a plate having a surface upon which glaze composition has been applied in accordance with this invention.

FIG. 14 is a fragmentary sectional view of the plate shown in FIG. 13, the view being taken in the plane indicated by line XIV—XIV of FIG. 13.

Figure 15:
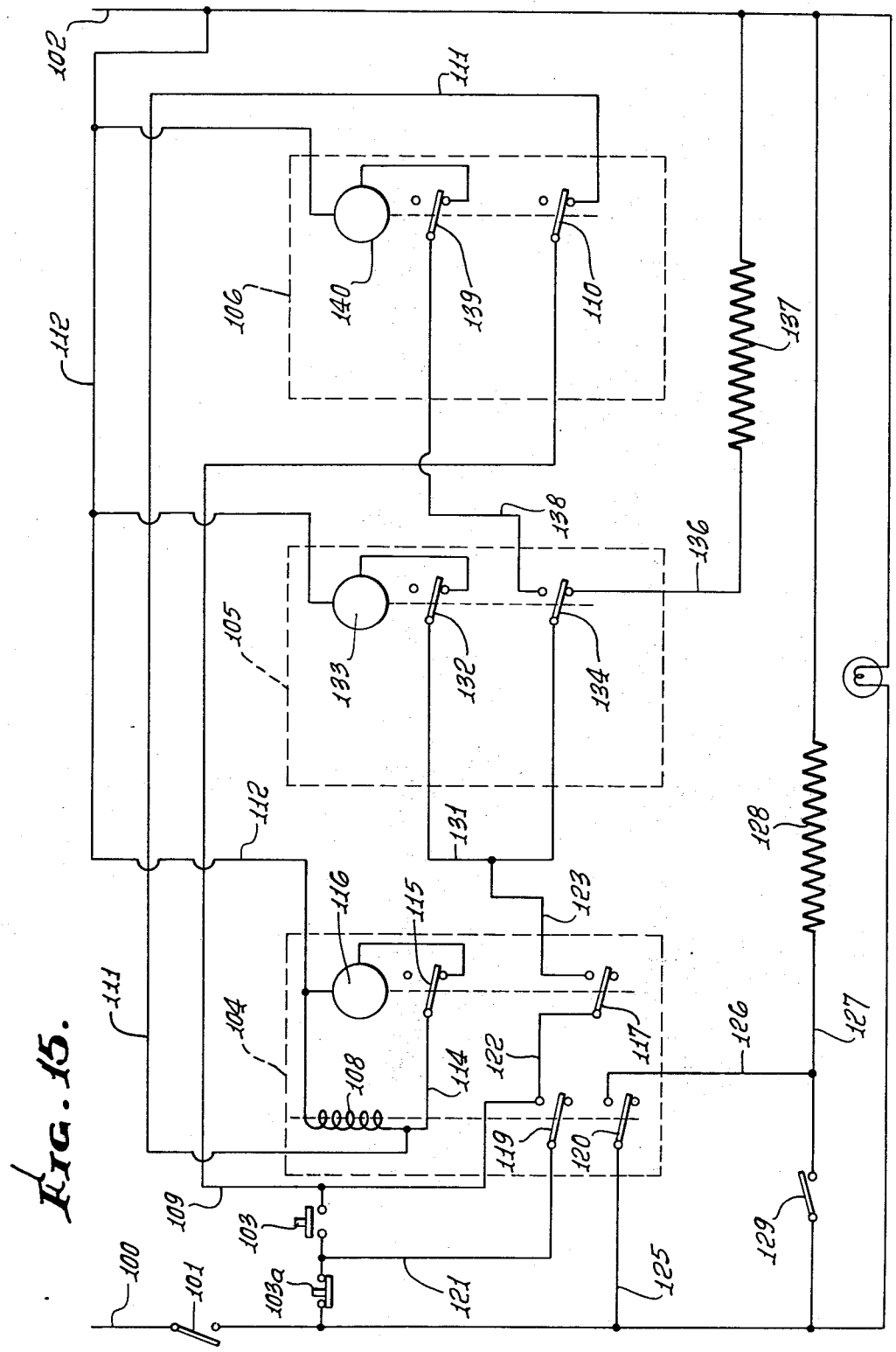
FIG. 15 is a schematic circuit diagram illustrating timed operation of the apparatus shown in FIG. 1.

Apparatus 20 embodying this invention generally includes a frame structure 21, a rotatable article support frame 22 which carries on one side of the axis of rotation 23 a mold member 24 in communication with flowable composition material in containers 25. On the opposite side of axis 23 the article support frame carries a ram means 26. At one side of the article support frame 22 is a housing 27 for control instrumentation and for operable means of pneumatic type as fully described in connection with FIG. 16.

Article support frame 21 may comprise a base member 30 attached by suitable means, not shown, to a floor surface 31. Spaced upright standards 32 are connected to base member 30, one of said standards 32 forming part of housing 27. Adjacent the top of each standard 32 is provided a bearing means 33 for rotatably mounting article support frame 22 about axis 23.

Article support frame or carrier 22 may comprise an open rectangular frame including side members 35, a top member 36, and a bottom U shaped member 37 lying in a plane normal to the side members 35 and opening to the front of the apparatus as indicated in FIG. 1. The U shaped member 37 of angle section provides a support for a removable plate 39. Plate 39 may be attached to member 37 by suitable fastening means such as clamps, not shown. Plate 39 supports mold member 24 and containers 25 as later described.

On the opposite side of axis 23, article support frame 22 provides at the central portion of top member 36 a support for cylinder 41 of ram means 26. The axis of cylinder 41 lies in the plane of side members 35 and normal to plate 39. Cylinder 41 is provided with air pressure lines 42 at opposite ends thereof and positively projects and retracts a piston rod 43 carrying within frame 22 a ram head 44.

Ram head 44 has attached to its downwardly directed circular face 45 a resilient yieldable pad of suitable foam-like material. Resilient pad 46 is provided with a central opening 47 and diametrical slots 48 leading from said opening to the outer circumference of pad 46 to permit escape of trapped air between an article and the pad 46 as later described. Pad 46 may be of uniform thickness and have a planar downwardly directed face interrupted by the radially extending slots 48 and the central opening 47.

Plate 39 which is releasably carried by U-member 37 on the article support frame 22 may be made of any suitable material and of suitable thickness capable of supporting containers 25 filled with a thick flowable composition material. Plate 39 may be made of metal, wood or a transparent heavy plastic material such as lucite or plexiglass.

On one face of plate 39 mold member 24 may be secured thereto as at 51 by suitable adhesive material. Mold member 24 may be made of suitable flexible elastomeric rubber-like materials such as polysulfide rubber, plastosol, natural rubber and the like. Dow Corning silicone rubber, Type G, Type E and Ren Plastics polyurethane No. 7040 are specific examples of materials which may be used to provide mold member 24. Mold member 24, which may also be referred to as a decorating head, includes significant features which contribute to the operability of this invention and apparatus. Mold member 24 comprises a generally cylindrical central body portion 52 having a bottom end wall 53 of relatively thick section and providing an end face for securement to and seating on the plate 39. The opposite end of body portion 52 has a convex surface configuration 54 which generally corresponds to the surface 55 of an article 56 such as a dinner plate whose surface 55 is to be decorated. The surface configuration 54 of the mold member 52 may vary in configuration depending upon the configuration of the article surface to be decorated. It is desirable that there be a relatively close match between the two configurations of article surface and mold member surface to assure tight sealing relation therebetween as later described.

As best seen in FIGS. 7-13, the cylindrical body portion 52 of mold member 24 is provided with a plurality of cavities or chambers 60 and 61 (FIG. 12). Chamber 60 is of spiral form beginning at its outer peripheral end 62 and terminating at its internal end 63. Similarly, chamber 61 has an outer end 64 and spirals inwardly to an inward end 65. As exemplarily shown in FIG. 7 the chambers 60 and 61 are defined by internal spirally configured walls 66 and 67, said walls 66 and 67 joining at the interior end walls of the chambers at 63 and 65. As shown in FIG. 7 the walls 66, 67 extend upwardly from the base wall 53 and are joined together adjacent their upper ends by webs 69. As best seen in FIG. 11, webs 69 define a plurality of spirally arranged openings 70 to chambers 60 and 61, the openings 70 defining the shape or design of the pattern to be applied to the dinner plate 56 as generally illustrated in FIG. 13. The convex configuration of the decorating head 24 and the pattern defined thereby is formed by the edge faces of the chamber defining walls 66, 67 and the outer cylindrical peripheral wall of the body portion 52 and the edge faces 71 of the webs 69. The openings 70 thus defined, provide direct communication with the chambers 60 and 61 although as best seen in FIG. 12 the chambers 60 and 61 are separate and independent so that they may carry composition material of different color or of different characteristics without intermingling thereof. It is important to note that webs 69 have sufficient thickness and sufficient depth so that the edge faces 71 thereof will have sufficient dimensional stability and resiliency to provide sealing engagement with the article surface 55 when it is pressed thereagainst.

Each mold cavity or chamber 60, 61 is supplied with a flowable or partially liquid semi-viscous slurry-like colorant fluid composition material from a receptacle or container 75 on the opposite side of plate 39. Container 75 may be of suitable volume and may be made of a plastic collapsible non-rigid material. Container 75 includes a container neck 76 having external threads 77 thereon which engage threads on a cap 78 which may be embedded in a recess 79 in plate 39 and secured thereto by suitable adhesive or bonding as at 80. Cap 78 has an axial port 81 through which a rigid tube or stand pipe extends, said pipe 82 passing through plate 39 and into mold member 24 and into its respective chamber 60, 61. The end 83 of stand pipe 82 extends above the base wall 53 and determines the level of colorant composition material in chamber 60, 61 when the apparatus is in initial non-application position. It will be apparent that container 75 may be readily removed from plate 39 by unscrewing the container and the supply of flowable composition material herein replenished so that desired quantities of composition material will be available to the mold member 24.

To prevent lateral collapse of container 75 when the collapsible type of receptacle is used, a cylindrical wall 85 may be secured to plate 39 to maintain a suitable length portion of container 75 in axial relationship with the stand pipe 82. Cylindrical wall 85 also serves to relieve strain upon the threaded connection of the neck of container 75 to the cap 78 which is retained by plate 39. Thus cylindrical wall 85 serves to assist in supporting the container 75 when the article support frame is rotated to reverse the relative vertical positions of the colorant composition supply and the mold member and dinner plate positioned thereon.

As indicated in FIG. 1 and 12 two of such supply containers 25 are illustrated. The other container is indicated with reference numerals with a prime sign for like parts. In FIG. 12 stand pipe 82' communicates with chamber 61 in the same manner as that described hereinabove with respect to stand pipe 82.

It will be understood that while only two containers are shown, one or more containers may be used, each container communicating with its respective cavity or chamber in the mold member which serves as a manifold for rapidly and virtually simultaneously conducting flowable composition material to the openings defined by the walls of the chamber and the webs between the walls which define the pattern or design to be placed upon the article surface. While two generally concentric spirals are shown, other designs which have been applied to dinnerware by this method have included floral designs having five different colorant material. Thus it will be apparent that the construction of the mold member with the desired number of separate independent cavities or chambers together with openings to said chambers which are configured in accordance with the design to be applied to the article surface may be readily constructed and fabricated for use with this invention.

The method of making such a mold member 24 may include any well known method in which the cavities and openings thereto may be formed by wax, plaster, or low melting metal which define the internal passages and are then removed at a later process stage.

Referring again to FIG. 7, mold member 24 also includes an annular flange 86 extending radially outwardly from body portion 52 in spaced relation to the convex mold surface 54. The outer peripheral edge of annular flange 86 includes an upturned annular rib 87 having an inner diameter corresponding to the outer diameter of the dinner plate 56 being decorated. Upturned annular rib 87 is concentric with the axis of the mold member and the cylindrical body portion and serves to center in coaxial relation the dinner plate 56 when it is placed in inverted position over the mold member 24.

As mentioned above, mold member 24 is made of a flexible relatively soft elastomeric material. To resiliently support annular flange 86, a ring or toroidal body 89 of resilient foam-like material is placed between the upper surface of support plate 39 and the bottom surface of annular mold flange 86. The height dimension of resilient body 89 is such that when dinner plate 56 is initially placed upon mold member 24 as shown in FIG. 7, the article surface 55 to be decorated is spaced a selected distance above the convex mold surface, an exemplary distance at the axis of the mold member and dinner plate being about one-quarter inch. At the peripheral edges of the cylindrical body portion 52 of the mold member the convex configuration of the mold member is formed so that the space between the article surface 55 and the cylindrical wall of the mold member may be about 5/16 of an inch. The difference in spacing between the center of the mold member and the peripheral edge of the mold member from the article surface facilitates escape of air therebetween during the ram pressure engagement operation and also facilitates separation of the mold member and dinner plate after the composition material has been deposited on the dinner plate as later described. It will be apparent that the annular resilient body 89 resiliently supports the plate in such spaced relation in its initial position and is capable of yielding as indicated in FIG. 10 to provide pressure sealing engagement between the article surface and the mold member.

In this example of the invention, resilient annular body 89 is illustrated as being made of a resilient open cellular foam type material. Other resilient yieldable means may be used as a coil spring having a selected compression-deflection characteristic. While the annular peripheral rib 87 provides a convenient centering device for the dinner plate 56, in the event articles of different shape such as a ceramic tile are to be decorated, other types of alignment means may be employed such as guide or register walls and pins.

As mentioned above, the resilient support body 89 is of open cellular construction to permit flow of air from the space between the dinner plate and the mold member, such air being in communication with the body 89 through a vent port 91 formed in the annular flange 86.

In this example dinnerware plate 56 is described as being an unfired green ware of ceramic composition. Article 56 may be a fired ceramic body, may be porous or non-porous, may be a flat, square, or rectangular tile body of ceramic material having a glazed or non-glazed surface to which the decorative material is to be applied, or may be any other article having a planar surface to be decorated or a three dimensional surface to be decorated. Depending upon the surface configuration of the article, mold member 24 will be prepared and fabricated to have a surface corresponding to the surface to be decorated with variation to provide spacing differential noted above.

In this example, a flowable fluid composition material has been described for deposit upon the article surface 55 of the dinner plate 56. Such a composition material may comprise suitable colorants to produce the desired design when fired, and may comprise a regular slip, colored engobes or glazes, and may create a raised pattern either for functional or decorative purposes. The flowable composition material may include thixotropic materials. The viscosity of the flowable material will depend upon the characteristics of the surface to be decorated and may vary somewhat depending upon this condition. However, the composition material should be flowable and its viscosity may be selected so as to deposit a coating of selected thickness on the surface of the article to be decorated. In the patterns to be applied to dinnerware, it has been found desirable that the composition material be relatively thick and the method of this invention is particularly adapted to the flowable application of thick deposits of colorant composition material on the surface of a porous ceramic green ware or bisque body.

Generally speaking, operation of the apparatus 20 embodying this invention includes filling and attaching containers of selected colorant composition material to the support plate 39 and placing such containers in communication with the cavities in the mold member carried thereby by threading the containers into the caps retained in plate 39. Support plate 39 is then assembled with and secured on base member 37 of the article support frame (FIG. 1). The ram means 26 is in retractd position and spaced above the mold member 24. An article to be decorated such as dinner plate 56 is then placed upon mold member 24 with the peripheral edges of the plate supported upon the resilient and spring supported annular flange of the mold member. Ram means 26 then descends so that the resilient foam pad 46 on the ram head is pressed against the back face of dinner plate 56 with sufficient force so that the annular flange 86 is depressed and article surface 55 of the plate is brought into pressure sealing engagement with the mold face of mold member 24. The edge faces of the mold walls 66, 67 and webs 69 thus define sealed-off areas on the article surface 55 to which the colorant composition material is to be applied. After a selected period of time as later described, the article support frame 22 is rotated 180° to invert the former vertical relationship of the ram means and the mold member as well as the relationship between the mold member and the dinner plate 56. Upon such reversal (FIG. 10), composition material which was contained in the reservoir below the level of the stand pipe 82 (FIG. 7), is caused to flow in cavities 60, 61 directly and almost simultaneously to all of the sealed-off areas of the article surface. Additional composition material is supplied from the container 75 by flow through the stand pipe 82. As noted in FIG. 10 the cavities 61, 62 become partly filled with the composition material and the composition material is in direct contact with the article surfaces to be decorated. Since air space is provided above the level of composition material in the position shown in FIG. 7, upon inverting of the apparatus and flow of material to the article surface, such air is readily displaced into the upper portion of the chamber as shown in FIG. 10. The level of colorant material in the chamber is again determined by the position of the stand pipe 82.

After a selected time period depending upon the thickness of the composition material and the porosity or nonporosity of the article surface, the article support frame is turned 180 degrees back to its original position in which the composition material is caused to drain from the cavities 61, 62 into the container 75 and into the bottom portion of the cavities to the level of the top of the stand pipe 82 as shown in FIG. 7. Upon return to initial position and after excess colorant material is removed from the pattern areas, the ram means is retracted. Upon release of the article mold holding pressure force, the resilient support flange 86 and its spring supporting annular foam member 89 lifts the dinner plate free from the mold surface. Such lifting is facilitated by the free air flow through the member 89, vent 91, and into the space between the dinner plate and the annular flange 86. Since the peripheral edge of the cylinder walls of the body portion 52 were spaced slightly greater than the center of the mold member from the center of the article surface of the plate, the return flow of air into the space above the colorant composition material in the chamber 60, 61 is facilitated. Retention of the plate on the mold member because of pressure differential such as vacuum or suction as a result of the displacement of the liquid is thereby prevented and eliminated.

The operator may then manually remove the dinner plate 56 from the mold member and place it on a suitable rack for drying. The deposit areas of colorant composition material will appear on the article surface as indicated in FIG. 13. The thickness of the deposit will depend upon the porosity of the ceramic ware and the thickness or viscosity of the colorant composition material together with the length of time during which the composition material was permitted to be in contact with the article surface. Depending upon the type of colorant composition material, during firing, the deposited colorant material may flow toward the adjacent colorant deposit so as to blend together adjacent colorant deposits in an attractive fanciful manner.

In the detailed operation of the apparatus, each of the above steps of the process is selectively automatically timed. An operator manually performs only the functions of placing the dinner plate on the mold member, pressing the start button on the machine, and then removing the plate after the machine has performed its cycle. In FIG. 15 the primary circuit leads 100, 102 are provided an on-off switch 101 to energize the actuating means of the apparatus. Current is provided by closing line switch 101, closing start button 103 to energize in sequential relation a crack-check timer 104, a deposit timer 105, and an end dwell timer 106. Timers 104, 105 and 106 are of well known types and are illustrated schematically within rectangular dash-like boxes.

When starter button 103 is closed, a circuit is completed to the clutch solenoid coil 108 of the timer 104 through line 109 and normally closed switch 110 of the timer 106 through line 111 to the bottom end of coil 108. The other end of coil 108 is connected by line 112 to main line 102. Line 111 at the lower end of coil 108 is also connected to line 114 and to a normally closed switch 115 which energizes timing motor 116 of timer 104. After a preselected time delay of for example, 5 seconds, timing motor 116 actuates normally open switch 117 to a close position. The purpose of the timer 104 is to provide sufficient time for the ram means 26 to move downwardly into pressure engagement with the plate on the mold member and to move the plate into sealing engagement with the mold member. The time is also sufficient to determine whether the green ware plate placed upon mold member 24 is fractured under the pressure of the ram means. In the event a crack is developed in the green ware, it will be apparent that inverting the mold member and ram so that the composition material will flow onto the cracked green ware will be very undesirable because colorant composition material will flow through the crack onto the ram head and splatter over the rest of the equipment.

Also during this initial crack check timing period it will be apparent from the circuit diagram that energization of the coil 108 will close normally open switches 119 and 120, switch 119 providing current flow from line 121 connected with the lead 100 ahead of the start button 103. When switch 119 is closed, line 122 conducts current to switch 117 which when closed by the timer 104 will provide current flow through lines 123 to the timer 105.

In addition, when coil 108 is energized and switch 120 is moved to closed position, current flow is provided from line 100 through line 125 to switch 120 and then through line 126 to line 127 which is connected with the air cylinder solenoid valve 128 which actuates the ram means 26. The ram head is thus caused to descend into pressure engagement with the plate to press the plate against the mold member 24. A microswitch 129 located on the housing 27 is engaged by the carriage 22 and moved to open position when the carriage is in its initial or down position. Upon turning of the article support frame 22 about axis 23, switch 129 is moved to closed position so that the ram means 26 will maintain the pressure engagement throughout the cycle until the article support plate is returned to its initial position and microswitch 129 is moved to open position by the carrier 37.

As mentioned before, the article support frame does not immediately commence rotation upon the closing of the start button 103. After the timer 104 has actuated switch 117, the current flow enters timer 105 through leads 131 and normally closed switch 132 to energize timer motor 133 to cause the timer 105 after a selected time period of, for example 60 seconds, to open switch 132 to de-energize timing motor 133. At the same time, switch 134 which in normal position provided current through line 136 to the solenoid valve 137 for actuating the means for turning the support frame about its axis 23 is caused to open the circuit to the air valve 137 and close the circuit through line 138 to the timer 106. Timer 106 is now energized by the normally closed switch 139 and timing motor 140 after a selected timer period of perhaps 30 seconds is actuated to open switch 139 to de-energize the timing motor and to also open switch 110 which opens the circuit to the timer 104 and the timing motor 116. The end dwell timer 106 provides a time period after the article support frame has been returned to its initial position with the glaze composition below the article surface 55 for draining or removal of excess glaze composition material from the pattern defining openings and to return such material to the reservoir in the mold member and in the container. It will be understood that the circuit diagram shown in FIG. 15 is exemplary and other circuit arrangements may be used to accomplish the sequence of steps described above.

Figure 16:
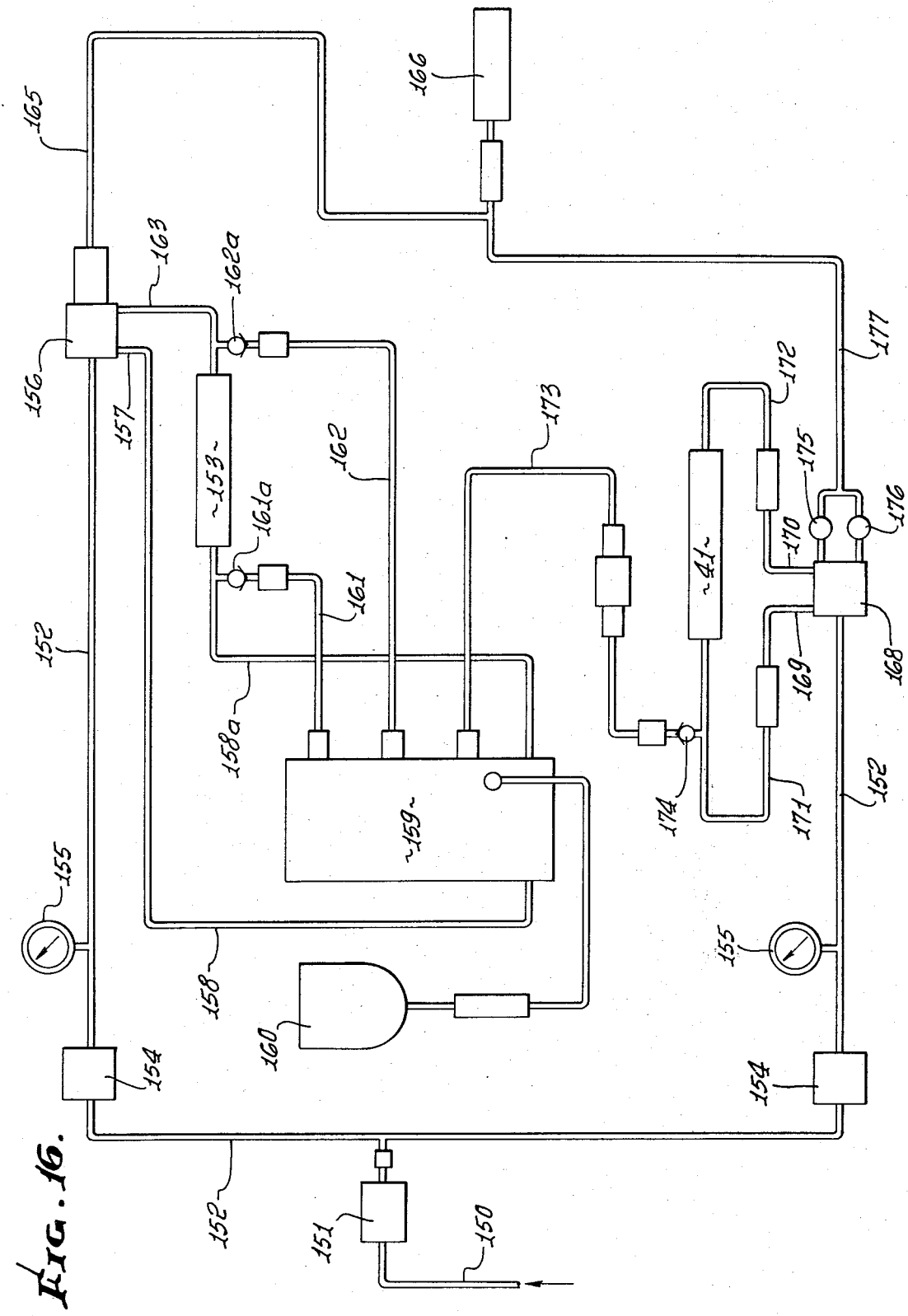
FIG. 16 is a schematic diagram illustrating pneumatic operable means for the apparatus of FIG. 1.

In FIG. 16 an exemplary pneumatic system is shown in which a compressed air supply is connected to line 150 and passed through a filter means 151 for distribution through line 152, to rotary actuator 153 and to the air clamping cylinder 41. In each line 152 there may be provided an air pressure regulator 154 and an air gauge 155. The air line 152 leading to the rotary actuator 153 passes through a four-way air valve 156 and is fed through a normally closed discharge port 157 to a line 158 leading to a pneumatic lubricator 159 supplied by selected oil from an oil reservoir 160. Air from line 158 is discharged from the lubricator with a predetermined amount of lubricant therein through oil lines 161 and 162 which permit reciprocal or alternate action of the rotary actuator by the four-way valve 156 through a normally open port 163. Rotary actuator 153 is of well known type and comprises air actuated rack and pinion means operably connected to one of stub shafts 23a on axis 23. Thus when air is traveling from 158 through the lubricator 159 and through line 158a to the actuator 153, check valve 161a will close, the actuator will rotate the article support frame in one direction and air exhausted from actuator 153 will enter the valve 156 through the normally open port 163 and the check valve 162a will be in closed position. Air entering valve 156 through port 163 will be exhausted through line 165 through a muffler 166 and discharged to atmosphere. Actuation of four-way valve 156 to cause rotation of the article support frame in the opposite direction will occur when air is introduced through port 163 and is exhausted through line 158a, 158, and port 157 and from valve 156 to the exhaust line 165.

The ram means and ram cylinder 41 is actuated in somewhat similar manner by introducing air from the other line 152 to a four-way valve 168 having a normally closed port at 169 and a normally open port at 170 which are connected by lines 171 and 172 to opposite ends of the ram cylinder 41. Line 171 is connected with lubricator 159 through line 173 and a check valve 174. The rate movement of the ram head toward the plate supported on the mold member is regulated by valves 175 and 176 connected with the discharge side of four-way valve 168 and also connected to discharge line 177 leading to the muffler 166. Valves 175 and 176 are adjusted relative to one another so that the rate of approach of the ram head to the dinner plate is controlled so that contact with the plate will not be too abrupt which might fracture the plate.

The apparatus described above provides means for supporting a piece of green ceramic ware of frangible characteristics in a resilient yieldable firm manner. Manual placement of the green ware on the mold member is readily accomplished because of the concentric arrangement of the supporting flange of the mold member with respect to the pattern defining face and the green ware to be decorated. The use of a pneumatic system for actuation of the ram means to cause the padded ram head to descend into firm contact with the back of the dinnerware and to then softly resiliently press the article surface 55 against the mold face without fracturing or cracking of the dinnerware is provided by regulator valve 154. The ultimate pressure placed upon the green ware closes the quarter to 5/16 inch space between the article surface 55 and the mold face in such a manner that the pattern defining edges of the mold face are firmly pressed against the article surface 55 in uniform sealing relation without endangering the integrity of the green ware. Thus the particular construction of the mold member, its annular supporting flange, and the resilient annulus which supports the flange provides a means for positioning and orienting the green ware for the decorating process with minimum danger to the green ware surfaces and body.

It is important to note that the colorant composition material which is supplied from the container and from the reservoir in the mold member is readily flowable over the surfaces of the material of the mold member and that the tendency of the composition material to stick to such surfaces of the mold member is minimized by the type of material used in the mold member and in the composition material. When the article support frame reverses the position of the green ware and the mold member so that the composition material flows by gravity onto the pattern areas of the article surface 55, the flow of such material from the reservoir in the mold member is unimpeded to the openings defined by the walls of the mold member and thus the composition material is directly immediately flowed onto and deposited on all of the exposed sealed-off areas of the article surface to be decorated. Since the mold member has been inverted by rotation through 180°, the flow of material by gravity in the manifold cavity or chamber provides a relatively uniform depth of glaze material covering the exposed article surface area being decorated. During such inversion, air is readily displaced. Air which might be trapped between the plate and the mold surface is readily dissipated from the vent opening 91 into the porous character of the foam member 89. The composition material is permitted to contact the article surface area for a preselected length of time as set by the timer 105, such time being sufficient to deposit a selected amount of composition material on the surface. Upon flip-flopping of the article and mold member to their initial position, the excess material adjacent the pattern defining openings is virtually simultaneously drained away and removed. The flow of material in such rotation through 180° also permits displacement of the air and composition material so that when the mold member and article reach their initial position, a quantity of air will be adjacent the pattern defining openings. Then when the pressure is released according to the timer 106, the green ware separates from the contact with the pattern defining edges by action of the resilient support member 89 and without the presence of a vacuum.

Figure 17:
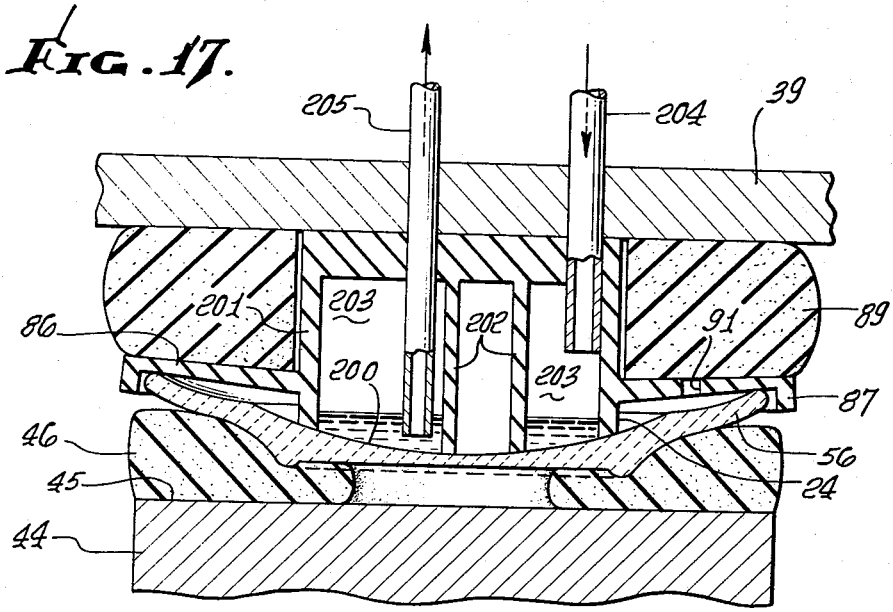
FIG. 17 is a fragmentary sectional view taken in a plane similar to that of FIG. 10 and illustrating a modification of the method and apparatus of this invention.

It will be understood that an important feature of the present invention is the providing of sealed-off areas to be decorated by means of a mold member having an opening to designate such areas, the opening being in communication with a supply of colorant composition material. The flowable material is brought into contact with the area to be decorated by gravitational flow of the material in the above-described embodiment by causing the reversal or flip-flop of the mold member and green ware. Colorant composition material may be brought into contact with such defined decorative areas by filling the cavities in communication with the opening and then removing excess material by withdrawal thereof as by a suction hose. Such a modification is illustrated in FIG. 17 wherein a plate 56, mold member 24 and cushioning pad 46 may be similar to that of the above described embodiment of the invention. A spring means 89 is supported from a plate 39 which may also have bonded to it the mold member 24 as above described. In FIG. 17 the parts are indicated in pressure relationship with the mold member 24 in sealed contact with the article surface to be decorated. In this example the pattern defining means are shown to provide a different pattern with sealed-off areas 200 to be decorated being defined by cylindrical wall 201 of the mold member and interior walls 202. In order to supply flowable colorant composition material to the cavity 203, such flowable material may be introduced through a tube 204 which may be connected to a pump and to a suitable supply source of such colorant material. The colorant material is pumped through tube 204 into the cavity 203 in a selected quantity sufficient to cover the article surface 200 to be decorated. The amount of material to be pumped may be suitably regulated by a timing device of known make. After the colorant material has partially filled the cavity 203 to cover the article surface to be decorated with a suitable thickness of colorant material, excess colorant material may be withdrawn from the cavity 203 as by a suction tube 205 which may be connected with a suitable suction pump not shown and which may also be connected to the supply source of the colorant material. Excess material is thus returned to the supply source of colorant material. In this embodiment, it will be apparent that the flow of colorant material is direct and unimpeded onto the article surface 200 and that the sealed relation of the mold member with the article surface will define the pattern of the deposit of the colorant material.

Figure 18:
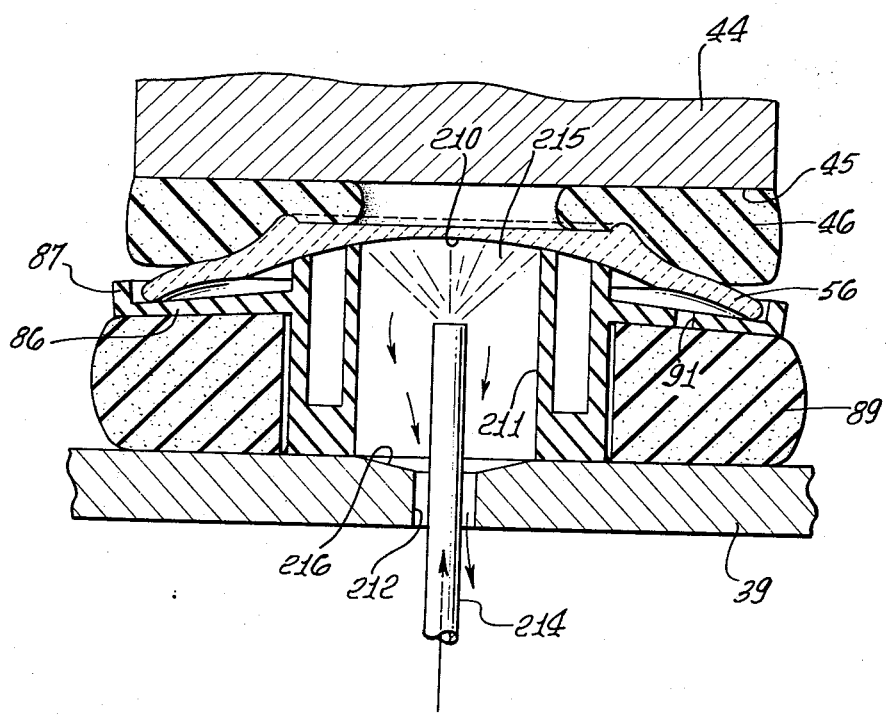
FIG. 18 is a fragmentary sectional view taken in a plane similar to that of FIG. 7 and illustrates still another modification of this invention.

The present invention also contemplates the provision of the use of such sealed-off areas to be decorated in communication with the cavity wherein a conduit containing flowable composition material may be inserted into the cavity and sprayed upwardly against the sealed-off areas to be decorated. Such an example of this invention is shown in FIG. 18 in which the sealed-off pressure relationship between the mold member and plate are similar to that shown in FIGS. 10 and 17 and for brevity will not be further described in detail. In FIG. 18 the plate 56 and mold member are positioned in such relationship that the article surface 210 to be decorated faces downwardly and opposite mold cavity 211 and an opening 212 in the mold carrying plate 39. Through opening 212 may be inserted a conduit 214 which may carry flowable colorant composition material under pressure so that the colorant material may be sprayed as indicated at 215 onto the article surface 210 to be decorated. Suitable nozzles or spray heads may be used to obtain the desired uniformity or irregularity of coverage of the article surface 210. It will be apparent that excess material which does not cling to the article surface 210 will fall by gravity to the bottom of the cavity and may drain therefrom through any suitable drain device, in this example indicated as inclined surfaces 216 leading to opening 212. It will be understood that the drainage may be at a different location than opening 212 and other suitable drainage means may be provided. Excess material is returned to the supply source of the colorant composition material.

Since one of the basic features of the present invention is the direct unimpeded contact of the glaze composition material with the area to be decorated, it will be understood that a predetermined amount of such material may be applied by filling a cavity whose edges are spaced a short distance from the surface of the article to be decorated so that the flowable material may spread by capillary action in said space. After this is accomplished, the excess material may be withdrawn from the cavity by any convenient means as by removal by suction or by turning the cavity and the article upside-down.

It will be apparent to those skilled in the art that the above-described method and apparatus provides for the application of a thick liquid slurry on an article by use of a mold member of soft elastomeric material having internal cavities with openings defining the pattern to be applied to the article. Such method of applying the flow material may readily be timed to create a raised or embossed-like pattern either for functional or decorative purposes. Application of the desired pattern may be made to a porous or non-porous or vitreous article, may be made directly onto an article surface, and the surface may then be finished in normal manner as by overglazing and firing. It will be readily apparent that the advantages of this method and apparatus are available in using various other decorating materials, paints, inks, stains, or granular materials as ceramic or plastic and the like that may or may not be subsequentially partly or fully melted and thereby create many different decorative effects. It will also be understood that the decorating materials used may or may not chemcially or physically react with prior or subsequent layers of the base material or of other decorating materials.

The invention also contemplates the direct application of colorant composition material or colored engobes directly upon the surface of a plaster mold which may include either a jigger mold, a slip casting mold, or pressing mold and the like. Such a plaster mold may take the place of the green ware plate 56 in the prior examples of the invention and colorant material deposited by the method and apparatus of this invention upon the surface of such a plaster mold. The plaster mold is then removed from the apparatus of this invention with the pattern defined thereon by the deposited colorant composition material. The plaster mold may then be placed on a jigger device and a piece of ware made upon the jigger so that the surface of the ware as it is being made on the jigger device will include the colorant material in its decorative pattern. When the jiggering of the ware is complete and the ware is removed from the plaster mold, the deposited colorant material will appear as a decorative colored inlay in the surface of the ware. The ware may then be finished in usual manner including firing and application of overglaze composition material. It should be noted that in such a method of creating an inlay design in an article surface, that the colorant composition material deposited upon the plaster mold would be readily released from its surface contact with the plaster mold. In this respect, the flow of the colorant material during firing may be enhanced or restricted by its composition depending upon the desired decorative effect.

Various changes and modifications may be made in the method and apparatus of this invention described above and which may come within the spirit of the invention. All such changes and modifications are embraced by the claims appended hereto.

We claim:
1. In a method of applying a thick film of flowable colorant composition material on a ceramic body in accordance with a selected design, the combination of the steps of:
   providing pattern defining means comprising an opening to a mold chamber, edge margins of said mold chamber being resilient and non-porous;
   sealingly engaging said edge margins against the surface of an article to be decorated;
   flowing a thick fluid composition material by gravity from said chamber directly to said pattern defining means onto areas of the article surface exposed within said pattern defining means;
   maintaining said fluid composition material in contact with said article surface for a preselected time period;
   reversing the position of said pattern defining means and article while maintaining sealed engagement thereof for removing by gravity flow fluid composition material which has not been applied to said article surface from the vicinity of said pattern defining means;
   and separating said article surface and said pattern defining means.

2. A method as stated in claim 1 including the steps of:
   positioning said chamber with the fluid composition material therein below said article surface while said article surface is pressure engaged with said edge margins of said pattern defining means;
   and reversing the position of said chamber and said article surface while in engagement to cause said composition material to flow by gravity to areas of said article surface defined by said pattern defining means.

3. A method as stated in claim 2 wherein the step of removing excess composition material from said article surface includes:
   returning said article surface and pattern defining means to its first position with the chamber below said article surface.

4. A method as stated in claim 1 including the step of:
   resiliently supporting said article in spaced relation to said pattern defining means before sealingly engaging said article surface and said edge margins.

5. In a method as stated in claim 1 including the step of:

retaining part of the excess glaze composition material in a portion of the mold chamber spaced from said edge margins of the pattern defining means.

6. In a method as stated in claim 1 including the step of:

controlling the displacement of air between said article surface and pattern defining means.

7. In a method as stated in claim 1 including supplying a plurality of fluids colorant composition material, each of said fluid colorant materials being flowable in its respective mold chamber and separated from adjacent fluid colorant material.

8. In a method of decorating a surface of an article and in which method a colorant composition material is deposited on the article surface in accordance with a pattern defining means of resilient non-porous material having a chamber therein for the composition material and adapted to resiliently pressure seal against said article surface, the steps of:

providing a supply of flowable fluid composition material in the chamber of said pattern defining means;

resiliently supporting said article surface in juxtaposed spaced relation to said pattern defining means;

moving said article surface into pressure sealing relation with said pattern defining means whereby openings to said chamber in said pattern defining means define sealed-off surface areas for deposit of said fluid material;

flowing by gravity said fluid composition material from said chamber onto said surface areas;

allowing said composition material to remain in contact with said article surface for a preselected time period;

inverting the article surface with respect to the pattern defining means for flowing by gravity excess fluid composition material away from the article surface;

returning excess composition material which has flowed away from said surface areas to said chamber;

releasing said pressure sealing engagement of the article surface with the pattern defining means after inverting the article surface with respect to the pattern defining means to return excess material to said chamber;

and removing said article from the means providing said resilient support thereof.

9. In a method of decorating a surface of an article by contacting selected surface areas with a flowable colorant fluid composition material, the steps of:

initially positioning said article with its surface to be decorated horizontally oriented, pressing pattern defining means in sealing relationship against said surface to delineate areas to be decorated and to be not decorated, said pattern defining means including hollow chamber means for confining a flowable fluid composition material and having pattern defining openings;

flowing by gravity a fluid composition material through said hollow chamber means into said openings to contact a portion of said flowable material with said areas to be decorated;

maintaining said contact for a preselected time period;

holding the sealing relationship of said pattern defining means and article surface while positioning said article 180° from its initial position;

removing by gravitational flow flowable material not in contact with said surface areas to be decorated;

and separating said pattern defining means from said article surface.

10. In a method as stated in claim 9 including the step of:

controlling displacement of air between said article surface and pattern defining means.

11. In a method as stated in claim 9 including the step of:

venting air space between the article surface and pattern defining means.

12. In a method as stated in claim 9 including the step of:

resiliently supporting said article while the pattern defining means is released from its sealing relationship with said article surface.

* * * * *